United States Patent [19]

Hasegawa et al.

[11] Patent Number: 5,022,947

[45] Date of Patent: Jun. 11, 1991

[54] METHOD FOR THE PREPARATION OF A WATER-RESISTANT PRINTED MATERIAL

[75] Inventors: Masamitsu Hasegawa; Satoshi Tamura; Isao Sugiyama; Takashi Wakashima, all of Saitama, Japan

[73] Assignee: Shin-Etsu Polymer Co., Ltd., Tokyo, Japan

[21] Appl. No.: 533,493

[22] Filed: Jun. 5, 1990

Related U.S. Application Data

[62] Division of Ser. No. 266,944, Nov. 3, 1988, Pat. No. 4,966,804.

[30] Foreign Application Priority Data

Nov. 30, 1987 [JP] Japan ................................ 62-301776

[51] Int. Cl.[5] ........................ B32B 31/20; B05D 1/02; B05D 5/00

[52] U.S. Cl. ................................ 156/277; 156/308.2; 427/258; 427/269

[58] Field of Search ........................ 427/258, 287, 269; 156/277, 308.2, 324.4

[56] References Cited

U.S. PATENT DOCUMENTS 4,522,881 6/1985 Kobayashi et al. ................. 428/336

*Primary Examiner*—Evan Lawrence

*Attorney, Agent, or Firm*—McAulay Fisher Nissen Goldberg & Kiel

[57] ABSTRACT

The invention provides a means to prepare a highly water-resistant printed material by the ink-jet printing method despite the water-solubility of the dye in the aqueous ink used in the ink-jet printing method. The inventive method comprises: overcoating the surface of the sheet material, which has a water-absorptive surface layer with receptivity of the aqueous ink and printed by the ink-jet printing method, with a curable polyisocyanate compound and bringing the overcoating layer under a condition capable of curing the polyisocyanate compound.

8 Claims, No Drawings

METHOD FOR THE PREPARATION OF A WATER-RESISTANT PRINTED MATERIAL

This is a division of application Ser. No. 266,944, filed Nov. 3, 1988, now U.S. Pat. No. 4,966,804.

BACKGROUND OF THE INVENTION

The present invention relates to a printed material imparted with improved water-proofness and a method for the preparation thereof. More particularly, the invention relates to a printed material having excellent water-proofness in which printing is made by the so-called ink-jet printing method using an aqueous ink composition which otherwise has only very poor water-proofness as well as a method for imparting excellent water-proofness to such an ink-jet printed material.

The above mentioned ink-jet printing method is one of the widely utilized printing methods for recording of characters and graphics on recording paper or sheet in output terminals of computers, word processors, facsimile machines and the like. As a principle of the ink-jet printing method, a low-viscosity ink is ejected from a number of fine nozzles each having an inner diameter of several tens of micrometers (μm) under controlled ejecting pressure and accelerating voltage to form ink droplets having a diameter of 100 to 200 μm with good stability which impinge at and are deposited on the recording paper or sheet as dots to form a patterned image thereon while occurrence of such ink dots is controlled in accordance with the pattern to be reproduced on the recording paper or sheet.

The above mentioned ink-jet printing method has several advantages over printing methods by other principles. For example, the printing can be performed producing no or little noise even in high-speed printing and visible printed images can be obtained directly without treatments of development and fixing. Further, plain paper can be used as the recording paper in the ink-jet printing method. The method is applicable not only to monochromatic printing but also to multi-color printing so that intensive efforts are being made for the development of an ink-jet printer capable of producing a colored hard copy from a color display and usable as the printers for facsimile machines, word processors, computer terminals and the like.

Needless to say, the ink-jet printing method is not without any problems and disadvantages. One of the major problems arises from the use of a low-viscosity aqueous ink. Namely, the ink droplets impinging at the surface of the recording sheet must infiltrate and be absorbed by the recording sheet as rapidly as possible so that at least the surface layer of the recording sheet is required to be highly water-absorptive in respect of the velocity and capacity of water absorption in order to ensure good quality of the printed images on the recording sheet. In this regard, it is widely practiced, especially when the base of the recording sheet is a film of a plastic resin having no water-absorptivity, that the surface of the recording sheet is coated with a highly water-absorptive particulate material which may be a fine powder of a highly water-absorptive resinous polymer such as saponification products of polymers of acrylic esters, copolymers of an acrylic ester and vinyl acetate, copolymers of vinyl acetate and maleic acid and the like, an inorganic highly-porous fine powder such as synthetic silica fillers or a mixture thereof uniformly dispersed in an adhesive binder such as polyester resins, acrylic resins, polyurethane resins, epoxy resins and the like. Since the coloring material or dye contained in the aqueous ink and deposited on and absorbed by the above mentioned coating layer of the water-absorptive particulate material is soluble in water, drawbacks of spreading and blur may sometimes be caused in the printed images on such a recording sheet to decrease or lose the legibility of the recorded images when the printed material is brought into contact with water or prolongedly kept under adverse conditions of a high temperature of, for example, 40° C. or higher and a high relative humidity of, for example, 80% or higher. Therefore, printed materials by the ink-jet printing method should be kept with good care not to cause such troubles. This problem is a factor greatly limiting the applicability and versatility of the ink-jet printing method even to destroy the above mentioned advantages inherent in the method.

SUMMARY OF THE INVENTION

The present invention accordingly has an object to provide a highly water-resistant printed material freed from the above described problems and disadvantages in the conventional printed material formed by the ink-jet printing method as well as to provide a method for the preparation of such a water-resistant printed material.

The water-resistant printed material of the present invention comprises:

(a) a base sheet material of which at least the surface layer has no or little capacity for absorption of water;

(b) a coating layer on one of the surfaces of the base sheet material made from a composition comprising a highly water-absorptive resinous polymer with optional admixture of an inorganic porous powder;

(c) a water-soluble coloring material deposited in dots to form a patterned image in the coating layer of the base sheet material, the dots of the water-soluble coloring material being formed by the ink-jet printing method using an aqueous ink containing the water-soluble coloring material; and (d) an overcoating layer made from a cured polyisocyanate compound, preferably, in a coating amount in the range from 5 to 40 $g/m^2$.

The water-proofness of the above defined printed material can be further enhanced by overlaying the surface of the printed material with a sheet or plate of a plastic resin which is bonded to the polyisocyanate-coated surface either by using a pressure-sensitive adhesive or by compression with heating.

The method of the present invention accordingly comprises, following printing of a sheet material of which at least the surface layer is made from a composition comprising a highly water-absorptive resinous polymer with optional admixture of an inorganic porous powder by the ink-jet printing method using an aqueous ink containing a water-soluble coloring material to form dots in a patterned image of the coloring material in the surface layer of the sheet material, the steps of:

(A) coating the surface of the sheet material after printing by the ink-jet printing method with a curable polyisocyanate compound, preferably, in a coating amount in the range from 5 to 40 $g/m^2$; and (B) bringing the coating layer under a condition capable of curing the polyisocyanate compound.

DETAILED DESCRIPTION OF THE PREFERRED EMBODIMENTS

As is understood from the above given description of the invention, the most characteristic feature of the inventive printed material consists in the overcoating layer (d) of a cured polyisocyanate compound over an ink-jet printed material.

The base of the printable sheet material, on which a patterned image is formed by the ink-jet printing method, can of course be a sheet of conventional recording paper but it is preferably made from a water-resistant material including films and sheets of a plastic resin, e.g., polyvinyl chloride, polyethylene, polypropylene, polycarbonate and acrylic resins, or a rubbery polymer, e.g., copolymeric rubbers of styrene and butadiene, nitrile rubbers, urethane rubbers, silicone rubbers, acrylic rubbers, butyl rubbers and polybutadiene rubbers, foils of a metal, e.g., aluminum, stainless steel, iron, copper, nickel, titanium and chromium, and sheets of ceramic fibers, e.g., alumina, magnesia and steatite. These sheet materials usually have a thickness in the range from 0.1 to 1.0 mm though not limited thereto.

The above named water-resistant sheet materials of course have no water-absorptivity so that it is essential that the surface of the sheet material is provided with a water-absorptive layer capable of absorbing droplets of an aqueous ink deposited thereon by the ink-jet printing method. Such a water-absorptive surface layer is formed from a highly water-absorptive polymeric resin with optional admixture of a highly porous inorganic powder. Desirably, the highly water-absorptive resin is capable of absorbing water in an amount of 100 to 1000 times of the weight of the resin per se and holding the absorbed water without separation even under a considerably high squeezing pressure. Examples of suitable highly water-absorptive polymeric resins include polymers of acrylic esters, saponification products of a copolymer of vinyl acetate and an acrylic ester, saponification products of a copolymer of vinyl acetate and maleic acid, crosslinked copolymers of isobutylene and maleic anhydride, saponification products of a polyacrylonitrile, graft polymers of acrylonitrile on starch and the like. The highly porous inorganic powder is exemplified by clay, talc, calcium carbonate, aluminum hydroxide, alumina, sodium silicate, finely divided silica filler and the like. These water-absorptive powdery materials are uniformly dispersed in an adhesive binder such as thermoplastic resins, thermosetting resins and synthetic rubbers to form a coating composition.

The base of the sheet material is then coated with the above described coating composition to be provided with a water-absorptive surface layer and printing is performed on this water-absorptive layer by the ink-jet printing method according to a known procedure using an ink-jet printer so that the droplets of the aqueous ink impinging at the surface are rapidly absorbed in the water-absorptive layer to form a printed image of characters and/or graphics by the water-soluble dye contained in the ink.

In the next place, the thus formed printed material, which as such has very poor water-proofness due to the solubility of the dye of the ink in water, is overcoated with a curable polyisocyanate compound which is preferably in the form of a solution in an organic solvent such as toluene, xylene, ethyl acetate and the like. Coating of the printed material with the coating solution of the polyisocyanate compound can be performed by any known method including brush coating, hand-roller coating, machine-roller coating, curtain-flow coating and the like.

Examples of the curable polyisocyanate compound usable here include tolylene diisocyanate (TDI), diphenylmethane diisocyanate (MDI), polyfunctional polyisocyanates, i.e. polymers of TDI, hexamethylene diisocyanate (HMDI), xylylene diisocyanate (XDI), lysine isocyanate and the like, of which HMDI and XDI are preferred in respect of the weatherability and resistance against yellowing. The coating amount of the polyisocyanate compound is in the range from 5 to 40 $g/m^2$ or, preferably, from 10 to 20 $g/m^2$. When the coating amount is too small, the desired water-proofness can hardly be obtained uniformly over the whole surface. When the coating amount is too large, on the other hand, extension of time may be necessary for full curing of the coating layer or curling of the printed material may be caused after curing of the coating layer with eventual cracking of the coating layer to destroy the water-proofness of the printed material.

It is important that the polyisocyanate compound in the overcoating layer is cured by a suitable means as rapidly as possible. In this regard, it is optional that the coating solution of the polyisocyanate compound is admixed with a curing catalyst, such as tertiary amines, dibutyl tin dilaurate and the like, to accelerate the curing reaction of the polyisocyanate compound. When properly formulated with a curing catalyst, the overcoating layer can be fully cured even by standing at room temperature following evaporation of the solvent although it would be convenient to accelerate the curing reaction by heating. When the base sheet is made from a poorly heat-resistant material such as a polyvinyl chloride resin, curing at a high temperature should be avoided so that the printed material provided with the overcoating layer is kept standing at room temperature for 7 days or heated at 60° C. for 24 hours. When the material has a relatively high heat resistance, as in acrylic and polycarbonate resins, full curing of the overcoating layer can be obtained by heating at 100° C. for 6 hours.

The thus prepared printed material of the invention has an overcoating layer of the cured polyisocyanate compound on the water-absorptive layer exhibiting the patterned image formed by the ink-jet printing method with a water-soluble ink dye. By virtue of the high water-resistance, durability and adhesion of the cured overcoating layer, the printed material of the invention is safe even when it is brought under adverse conditions of contacting with water or keeping under a high humidity at a high temperature without spreading or blur of the ink so that a great expansion can be expected in the applicability of the ink-jet printing method in respect of the easiness in handling of the printed materials.

Although the above described printed material of the invention has water-resistance sufficiently high in most applications, it is also a possible way that the water-proofness of the printed material is further enhanced by overlaying a thin plastic film on the overcoating layer of the cured polyisocyanate compound by a known method for lamination. For example, a plastic sheet having a thickness of 0.1 to 1 mm can be bonded to the printed material coated with an acrylic pressure-sensitive adhesive in a thickness of 5 to 50 $\mu m$ by use of a laminator. When the plastic sheet has a larger thickness, it is more convenient that the plastic sheet or plate is applied to the overcoating layer of the printed material before curing and pressed with heating at a temperature of 100° to 150° C. under a pressure of 5 to 30 kg/cm$^2$ so that the plastic sheet is integrated with the simultaneously cured overcoating layer of the curable polyisocyanate compound to protect the printed material against any external impact force.

In the following, the present invention is described in more detail by way of examples, in which the term of "parts" always refers to "parts by weight".

EXAMPLES 1 TO 3 AND COMPARATIVE EXAMPLE 1

A coating composition was prepared by uniformly mixing 60 parts of a fine powder of a highly water-absorptive poly(acrylic acid) resin in the form of a sodium salt (Sumikagel NP-1010, a product by Sumitomo Chemical Co.) having an average particle diameter of 10 μm and capable of absorbing water in an amount of 1000 times of the weight of the powder per se, 100 parts of a finely divided silica powder (Siloyd 404, a product by Fuji Davidson Co.), 200 parts of a 50% by weight solution of a saturated polyester resin (Polyester LP-035, a product by Japan Synthetic Chemical Co.) and 200 parts of toluene.

A transparent film of unplasticized polyvinyl chloride resin having a thickness of 0.1 mm was coated with the above prepared coating composition in a coating thickness of 40 to 60 μm after drying to give a sheet material printable with an aqueous printing ink.

The thus prepared printable sheet material is subjected to multi-color ink-jet printing using four inks of cyan, magenta, yellow and black on an ink-jet printer (Model 10-725, manufactured by Sharp Co.) to form a patterned image and then the printed surface was overcoated with a 50% by weight solution of a polyisocyanate compound in toluene (Coronate HL, a product by Japan Polyurethane Co.) in a coating amount of 15 g/m$^2$ (Example 1), 4 g/m$^2$ (Example 2) and 50 g/m$^2$ (Example 3) as dried by using a hand roller. After drying by evaporating the solvent, the printed material was kept standing at room temperature for 7 days so that the overcoating layer of the polyisocyanate compound was found to have been fully cured. The thus obtained printed materials and a comparative printed material prepared in the same manner as above but by omitting the overcoating with the polyisocyanate compound (Comparative Example 1) were subjected to the tests described below.

The water resistance of these printed materials was tested by immersing the printed material in water at room temperature. Absolutely no blur of the printed images was found in each of the printed materials of Examples 1 to 3 after 24 hours of immersion in water while a slight blur was found in the printed material of Example 2 after 10 days of immersion in water. Absolutely no blur of the printed images was found in each of the printed materials of Examples 1 and 3 even after 10 days of immersion in water. On the other hand, the printed image on the printed material of Comparative Example 1 was lost completely after 24 hours of immersion in water.

Further, these printed materials were kept at 60° C. in an atmosphere of 95% relative humidity for 10 days and examined for the condition of the printed images. The results were that absolutely no blur was found in the printed materials of Examples 1 and 2 and some blur of the yellow ink had taken place in the printed material in Example 3 while the printed image was completely lost in the printed material of Comparative Example 1.

EXAMPLE 4.

The printed material obtained in Example 1 described above was coated on the surface of the overcoating layer of the cured polyisocyanate compound with an acrylic pressure-sensitive adhesive (Alontack SC-3950, a product by Toa Synthetic Chemical Co.) in a uniform coating thickness of 20 μm. A transparent sheet of an unplasticized polyvinyl chloride resin having a thickness of 0.3 mm was applied to the thus adhesive-coated surface and bonded thereto by using a laminator. In this way, the water-proofness of the printed material could be more complete while the printed material still retained flexibility.

EXAMPLE 5

A transparent plate of an unplasticized polyvinyl chloride resin having a thickness of 3 mm was applied to the surface of the overcoating layer of the cured polyisocyanate compound on the printed material in Example 1 and the resin plate and the printed material were bonded together by pressing for 10 minutes in a press machine under a pressure of 20 kg/cm$^2$ at a temperature of 120° C. In this manner, a printed board was obtained which had excellent water resistance and high mechanical strengths with full protection of the printed images.

What is claimed is:

1. A method for the preparation of a water-resistant printed material which comprises the steps of:

(A) coating the surface of a base sheet material, of which at least the surface layer has no or little capacity of absorbing water, with a coating composition comprising a water-absorptive resinous polymer to form a printable sheet material having a water-absorptive coating layer;

(B) forming a dot-wise printed image in said coating layer using an aqueous ink containing a water-soluble coloring material by the method ink-jet printing;

(C) overcoating the surface of the printed sheet material after printing by the ink-jet printing method with a curable polyisocyanate compound; and (D) curing the polyisocyanate compound.

2. The method of claim 1 wherein the coating composition further comprises an inorganic porous powder.

3. The method of claim 1 wherein the overcoating is carried out in a coating amount in the range from 5 to 40 g/m$^2$.

4. The method of claim 1 which further comprises bonding an overlay sheet of a plastic resin onto the cured polyisocyanate.

5. The method of claim 4 wherein the bonding is carried out with a pressure-sensitive adhesive.

6. The method of claim 4 wherein the bonding is effected by thermal adhesion under pressure.

7. The method of claim 1 wherein the resinous polymer is poly(acrylic acid) in the form of a sodium salt.

8. The method of claim 1 wherein the polyisocyanate compound is hexamethylene diisocyanate or xylylene diisocyanate.

* * * * *